United States Patent
Boswell et al.

(10) Patent No.: US 11,247,616 B2
(45) Date of Patent: Feb. 15, 2022

(54) SENSOR AIRFLOW APPARATUS

(71) Applicant: Ford Global Technologies, LLC, Dearborn, MI (US)

(72) Inventors: Matthew Dennis Smith Boswell, Westland, MI (US); Venkatesh Krishnan, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 454 days.

(21) Appl. No.: 16/522,368

(22) Filed: Jul. 25, 2019

(65) Prior Publication Data

US 2021/0024010 A1  Jan. 28, 2021

(51) Int. Cl.
| | |
|---|---|
| *G08G 1/017* | (2006.01) |
| *B60R 11/04* | (2006.01) |
| *B60R 11/00* | (2006.01) |
| *B60R 13/06* | (2006.01) |

(52) U.S. Cl.
CPC ............... *B60R 11/04* (2013.01); *B60R 13/06* (2013.01); *B60R 2011/004* (2013.01)

(58) Field of Classification Search
CPC ... B60R 11/04; B60R 13/06; B60R 2011/004; G03B 17/56
See application file for complete search history.

(56) References Cited

U.S. PATENT DOCUMENTS

| | | | |
|---|---|---|---|
| 10,232,774 B2 | 3/2019 | Trebouet | |
| 2018/0079392 A1 | 3/2018 | Karasik | |
| 2020/0149933 A1* | 5/2020 | Robertson, Jr. | ........... B60S 1/56 |
| 2021/0094079 A1* | 4/2021 | Krishnan | .................. B60S 1/52 |
| 2021/0201054 A1* | 7/2021 | Toth | .................. G06K 9/00791 |
| 2021/0302541 A1* | 9/2021 | Fields | ...................... H05K 7/14 |

FOREIGN PATENT DOCUMENTS

| | | |
|---|---|---|
| CN | 106347316 B | 5/2018 |
| JP | 2018069874 A | 5/2018 |
| JP | 2018189847 A | 11/2018 |

* cited by examiner

*Primary Examiner* — Toan N Pham
(74) *Attorney, Agent, or Firm* — Frank A. MacKenzie; Bejin Bieneman PLC

(57) ABSTRACT

A sensor assembly includes a housing defining a chamber and including a panel including an aperture; a camera disposed inside the chamber and including a base, a lens spaced from the base, and a tube elongated from the base to the lens; and a tunnel mounted to the base and elongated concentrically with the tube. The lens defines a field of view of the camera through the aperture. The tunnel defines a concentric gap between the tube and the tunnel from the base to the lens.

18 Claims, 8 Drawing Sheets

SENSOR AIRFLOW APPARATUS

BACKGROUND

Vehicles typically include sensors. The sensors can provide data about operation of the vehicle, for example, wheel speed, wheel orientation, and engine and transmission data (e.g., temperature, fuel consumption, etc.). The sensors can detect the location and/or orientation of the vehicle. The sensors can be global positioning system (GPS) sensors; accelerometers such as piezo-electric or microelectromechanical systems (MEMS); gyroscopes such as rate, ring laser, or fiber-optic gyroscopes; inertial measurements units (IMU); and/or magnetometers. The sensors can detect the external world, e.g., objects and/or characteristics of surroundings of the vehicle, such as other vehicles, road lane markings, traffic lights and/or signs, pedestrians, etc. For example, the sensors can be radar sensors, scanning laser range finders, light detection and ranging (LIDAR) devices, and/or image processing sensors such as cameras.

DETAILED DESCRIPTION

Figure 1:
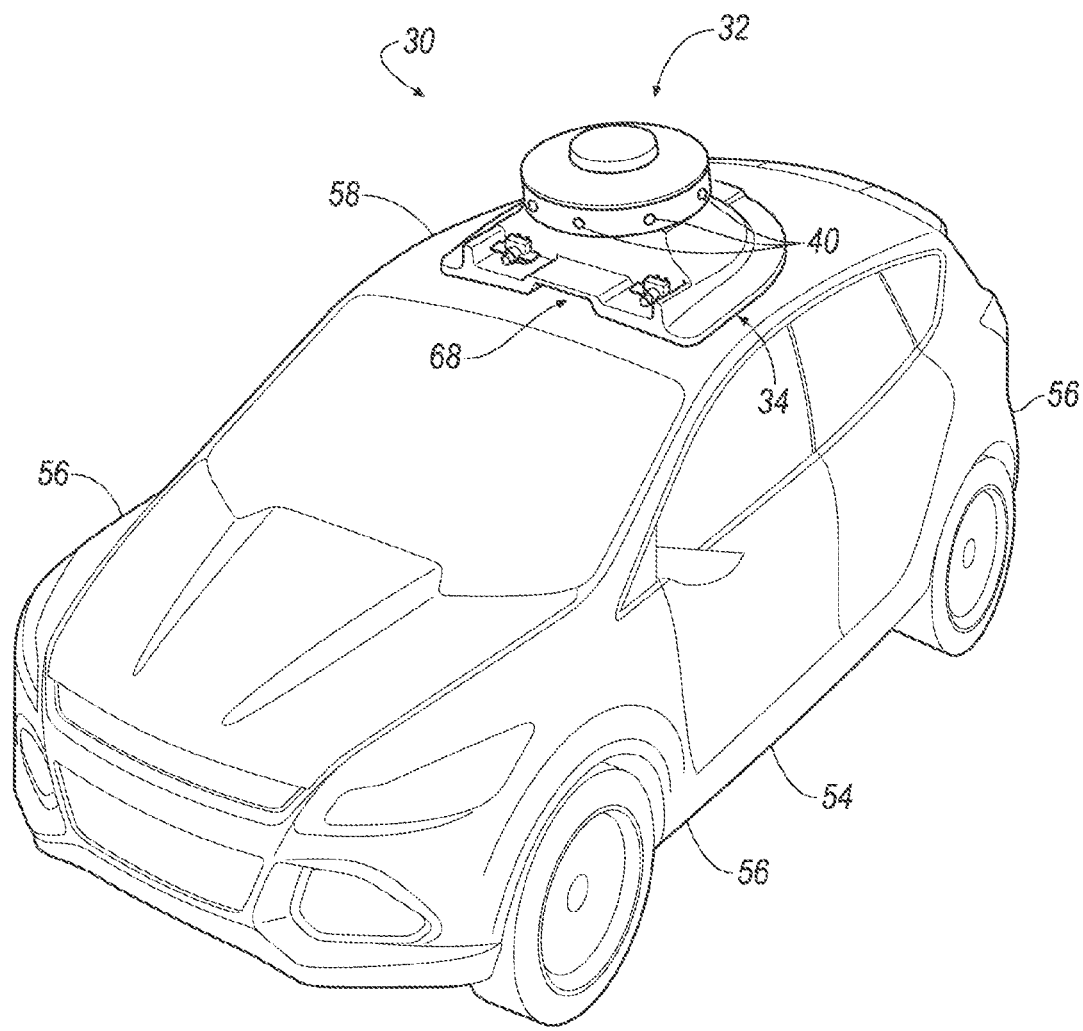
FIG. 1 is a perspective view of an example vehicle.

A sensor assembly includes a housing defining a chamber and including a panel including an aperture; a camera disposed inside the chamber and including a base, a lens spaced from the base, and a tube elongated from the base to the lens, the lens defining a field of view of the camera through the aperture; and a tunnel mounted to the base and elongated concentrically with the tube, the tunnel defining a concentric gap between the tube and the tunnel from the base to the lens.

The sensor assembly may further include a seal attached to the tunnel and contacting the panel. The seal may be double-shot-molded with the tunnel.

The seal may be elastomeric.

The tunnel may include an annular disc concentric around the lens, and the disc may define an annular slot extending circumferentially partially around the lens. The disc may be shaped to guide airflow from inside the housing through the slot into an air curtain across the lens.

The disc and the panel may form the slot.

The sensor assembly may further include a seal mounted to the annular disc, extending circumferentially partially around the lens, and contacting the panel. The seal and the slot may collectively extend 360° around the lens.

The seal may block airflow from inside the housing through the aperture except through the slot.

The sensor assembly may further include a liquid nozzle mounted to the disc and aimed through the slot at the lens.

The disc may include a radially inner surface, a radially outer surface, and a front surface extending along the slot and facing toward the panel, and the front surface may slope away from the panel from the radially inner surface to the radially outer surface.

The sensor assembly may further include a pressure source positioned to raise a pressure in the chamber above an atmospheric pressure. The pressure source may be a blower.

The tunnel may include a drain hole. The drain hole may be axially spaced from the base and from the lens.

The aperture may be circular.

The tunnel may not contact the tube.

With reference to the Figures, a sensor assembly 32 for a vehicle 30 includes a housing 34 defining a first chamber 36 and including a panel 38 including an aperture 40; at least one camera 42 disposed inside the chamber and including a base 44, a lens 46 spaced from the base 44, and a tube 48 elongated from the base 44 to the lens 46; and a tunnel 50 mounted to the base 44 and elongated concentrically with the tube 48. The lens 46 defines a field of view of the camera 42 through the aperture 40. The tunnel 50 defines a concentric gap 52 between the tube 48 and the tunnel 50 from the base 44 to the lens 46.

The sensor assembly 32 provides an air curtain across the lens 46 of the camera 42, i.e., a thin layer of moving air covering substantially an entirety of the lens 46. The air curtain can prevent debris from contacting the lens 46 and can remove debris from the lens 46. The air curtain can be provided across an entirety of the lens 46 without dead zones. The air curtain can shield the camera 42 from wind from the ambient environment, and the sensor assembly 32 can thereby reduce vibration experienced by the camera 42. Moreover, the sensor assembly 32 can reduce vibrations experienced by the lens 46 because the concentric gap 52 eliminates a path by which vibrations can be transmitted to the lens 46 from the panel 38. The sensor assembly 32 can efficiently provide these benefits with a small number of parts and with a small packaging space. The sensor assembly 32 keeps components other than the lens 46 concealed behind the panel 38, providing an aesthetically pleasing, sleek design as seen from an outside observer and protecting the components from the ambient environment.

With reference to FIG. 1, the vehicle 30 may be any passenger or commercial automobile such as a car, a truck, a sport utility vehicle, a crossover vehicle, a van, a minivan, a taxi, a bus, etc.

The vehicle 30 may be an autonomous vehicle. A computer can be programmed to operate the vehicle 30 independently of the intervention of a human driver, completely or to a lesser degree. The computer may be programmed to operate the propulsion, brake system, steering, and/or other vehicle systems. For the purposes of this disclosure, autonomous operation means the computer controls the propulsion, brake system, and steering without input from a human driver; semi-autonomous operation means the computer controls one or two of the propulsion, brake system, and steering and a human driver controls the remainder; and nonautonomous operation means a human driver controls the propulsion, brake system, and steering. The computer may rely on data from the cameras 42 to autonomously or semi-autonomously operate the vehicle 30.

The vehicle 30 includes a body 54. The vehicle 30 may be of a unibody construction, in which a frame and the body 54 of the vehicle 30 are a single component. The vehicle 30 may, alternatively, be of a body-on-frame construction, in which the frame supports the body 54 that is a separate component from the frame. The frame and the body 54 may be formed of any suitable material, for example, steel, aluminum, etc. The body 54 includes body panels 56 partially defining an exterior of the vehicle 30. The body panels 56 may present a class-A surface, e.g., a finished surface exposed to view by a customer and free of unaesthetic blemishes and defects. The body panels 56 include, e.g., a roof 58, etc.

Figure 2:
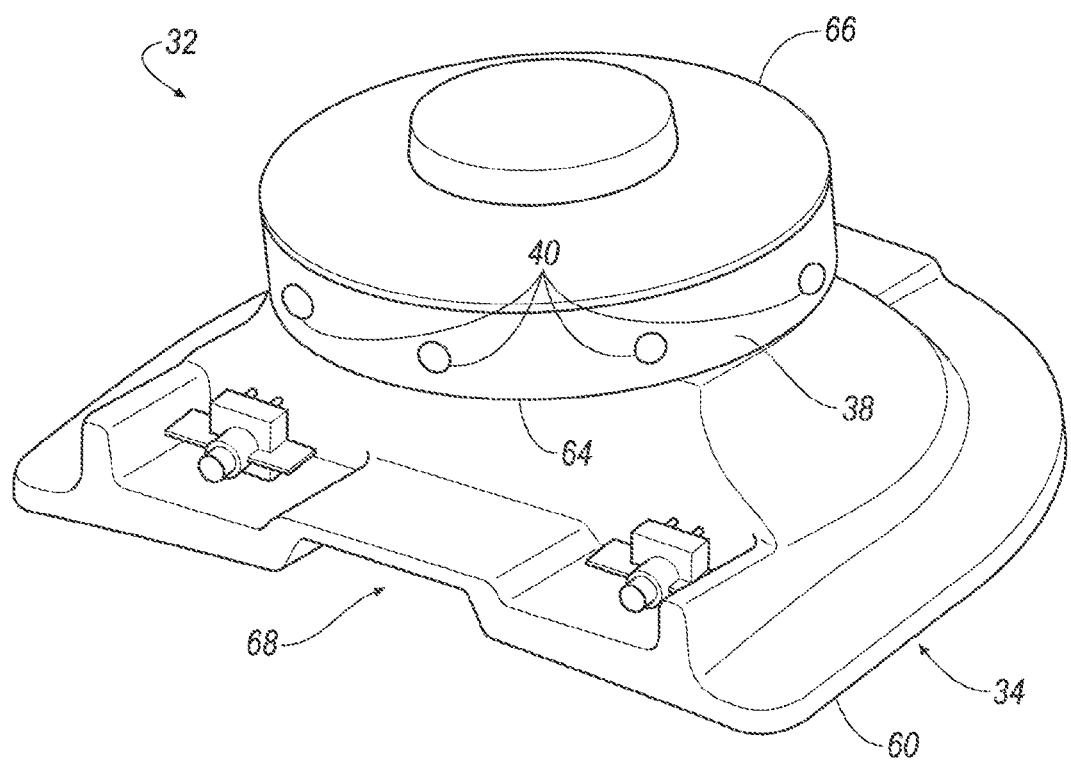
FIG. 2 is a perspective view of an example housing on the vehicle.

With reference to FIGS. 1 and 2, the housing 34 for the cameras 42 is attachable to the vehicle 30, e.g., to one of the body panels 56 of the vehicle 30, e.g., the roof 58. For example, the housing 34 may be shaped to be attachable to the roof 58, e.g., may have a shape matching or following a contour of the roof 58. The housing 34 may be attached to the roof 58, which can provide the cameras 42 with an unobstructed field of view of an area around the vehicle 30. The housing 34 may be formed of, e.g., plastic or metal.

Figure 3:
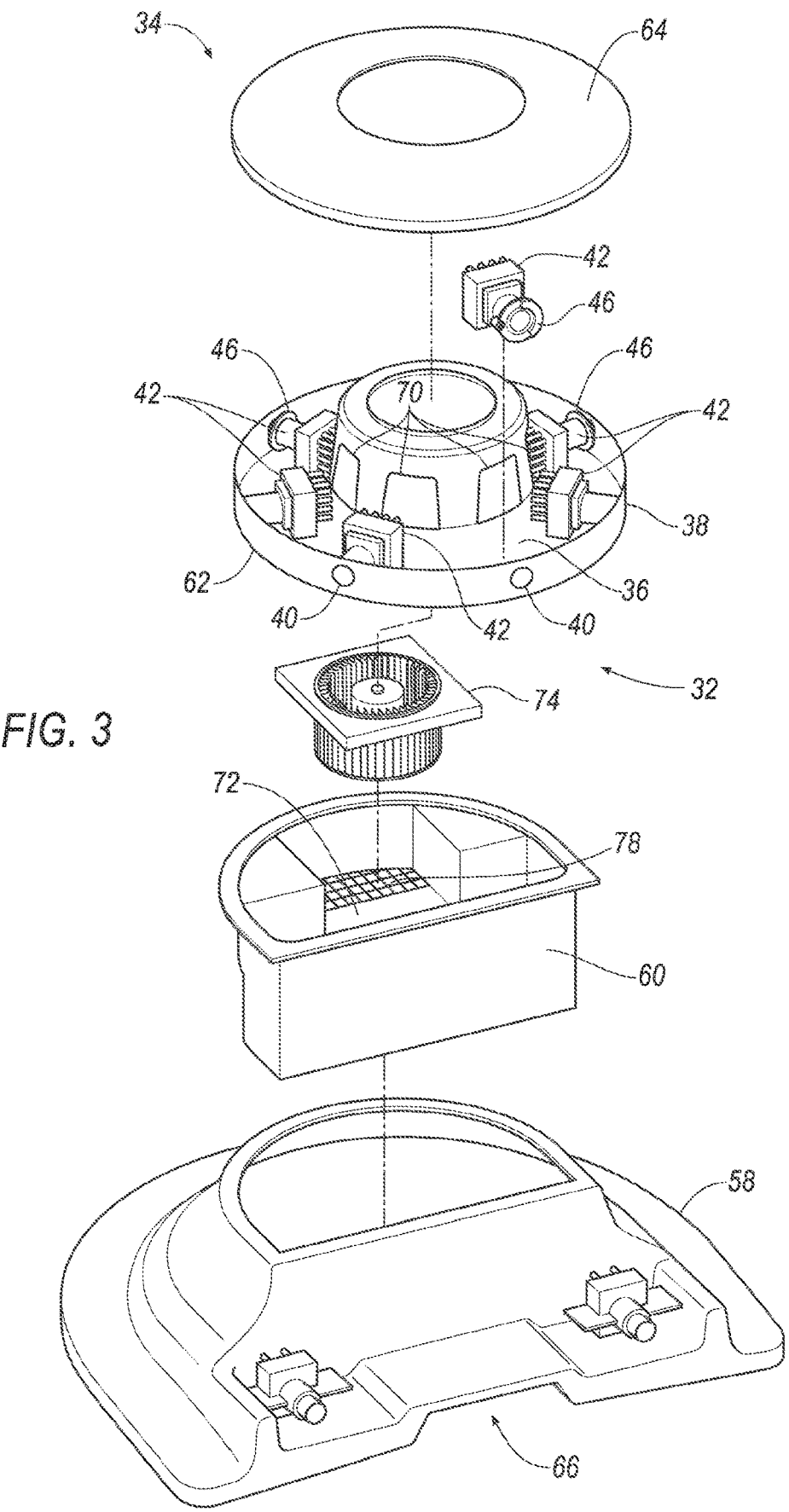
FIG. 3 is an exploded view of the housing.

With reference to FIG. 3, the housing 34 includes a foundation 60, a bucket 62, a tray 64, and a top cover 66. The foundation 60 is attached to the roof 58 and includes an intake opening 68. The intake opening 68 is positioned to face forward when the housing 34 is mounted on the vehicle 30. The foundation 60 has a bottom surface shaped to conform to the roof 58 of the vehicle 30 and a top surface with an opening shaped to receive the bucket 62.

The bucket 62 sits in the foundation 60. The bucket 62 is a container with an open top, i.e., a tubular shape with a closed bottom and an open top. The bucket 62 includes a lip at the top shaped to catch on the top of the base 44. The bucket 62 has a substantially constant cross-section along a vertical axis between the top and the bottom.

The tray 64 sits on top of the foundation 60 and the bucket 62. The cameras 42 are disposed in the tray 64. The tray 64 includes the panel 38, which serves as a circumferential outer wall, and the tray 64 includes a circumferential inner wall 70. The panel 38 and the inner wall 70 each has a cylindrical shape. The tray 64 includes a floor 72 extending radially outward from the inner wall 70 to the panel 38. The apertures 40 are in the panel 38. The inner wall 70 includes tray openings 74 positioned radially inwardly from respective cameras 42 relative to the tray 64.

The top cover 66 is attached to the tray 64 and encloses the tray 64 from the inner wall 70 to the panel 38. The top cover 66 includes a hole sized to receive the inner wall 70 of the tray 64. The top cover 66 extends radially outward relative to the tray 64 from the inner wall 70 to the panel 38. The tray 64 and the top cover 66 together form a toroidal shape.

Figure 4:
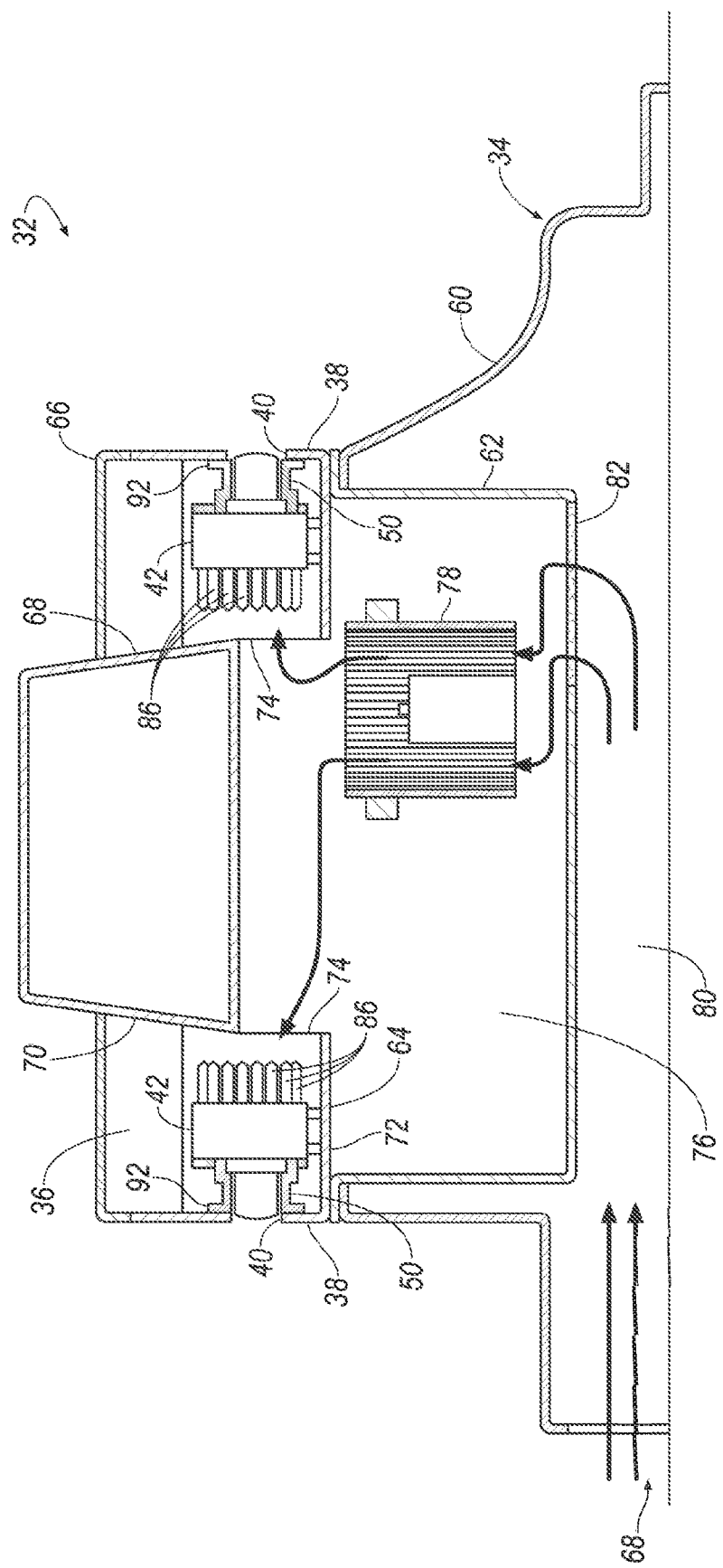
FIG. 4 is a side cross-sectional view of the housing.

With reference to FIG. 4, the housing 34 defines the first chamber 36 in which the cameras 42 are disposed, and the housing 34 defines a second chamber 76 in which a pressure source 78 is disposed. The first chamber 36 may be disposed above the second chamber 76. For example, the tray 64 and the top cover 66 enclose and form the first chamber 36. For example, the foundation 60 and the bucket 62 enclose and form the second chamber 76, as shown in FIG. 4. Alternatively, one or more of the body panels 56, e.g., the roof 58, may partially enclose and form the second chamber 76 along with the foundation 60 and/or bucket 62.

The pressure source 78 increases the pressure of a gas occupying the first chamber 36. For example, the pressure source 78 may be a blower, which may reduce a volume of the gas or force additional gas into a constant volume. The pressure source 78 may be any suitable type of blower, e.g., a positive-displacement compressor such as a reciprocating, ionic liquid piston, rotary screw, rotary vane, rolling piston, scroll, or diaphragm compressor; a dynamic compressor such as an air bubble, centrifugal, diagonal, mixed-flow, or axial-flow compressor; a fan; or any other suitable type.

The pressure source 78 is positioned to raise a pressure of the first chamber 36 above an atmospheric pressure. For example, the pressure source 78 is positioned to draw air from an ambient environment outside the housing 34 and to blow the air into the first chamber 36. The pressure source 78 is disposed in the second chamber 76 outside the first chamber 36, e.g., attached to the bucket 62 inside the bucket 62. For example, air enters through the intake opening 68, travels through a passageway 80 below the second chamber 76, travels through a filter 82 leading through a bottom of the bucket 62, and then travels to the pressure source 78. The filter 82 removes solid particulates such as dust, pollen, mold, dust, and bacteria from air flowing through the filter 82. The filter 82 may be any suitable type of filter, e.g., paper, foam, cotton, stainless steel, oil bath, etc. The pressure source 78 blows the air into the second chamber 76, and the air travels through the tray openings 74 into the first chamber 36.

Alternatively to the pressure source 78 being a blower, the sensor assembly 32 may pressurize the first chamber 36 of the housing 34 in other ways. For example, forward motion of the vehicle 30 may force air through passageways leading to the first chamber 36.

The housing 34 includes the apertures 40. The apertures 40 are holes in the housing 34 leading from the first chamber 36 to the ambient environment. The apertures 40 are through the panel 38 of the tray 64. The apertures 40 are circular in shape. The housing 34 includes one aperture 40 for each of the cameras 42. Each camera 42 has a field of view received through the respective aperture 40. The cameras 42 may extend into the respective apertures 40. For example, the aperture 40 may be concentric about a portion of the camera 42, e.g., the lens 46.

Figure 5:
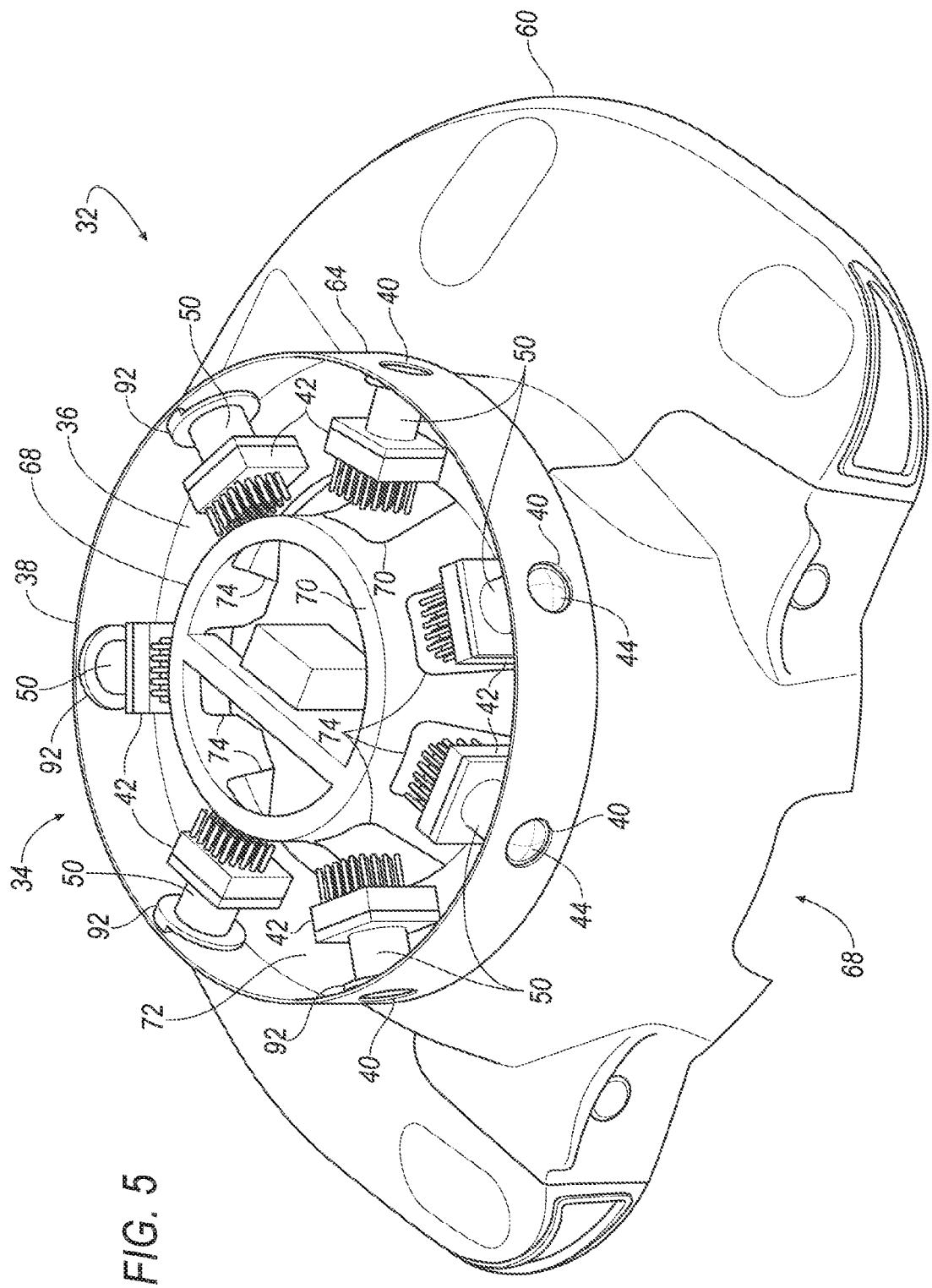
FIG. 5 is a perspective view of the housing with a chamber exposed for illustration.
Figure 6:
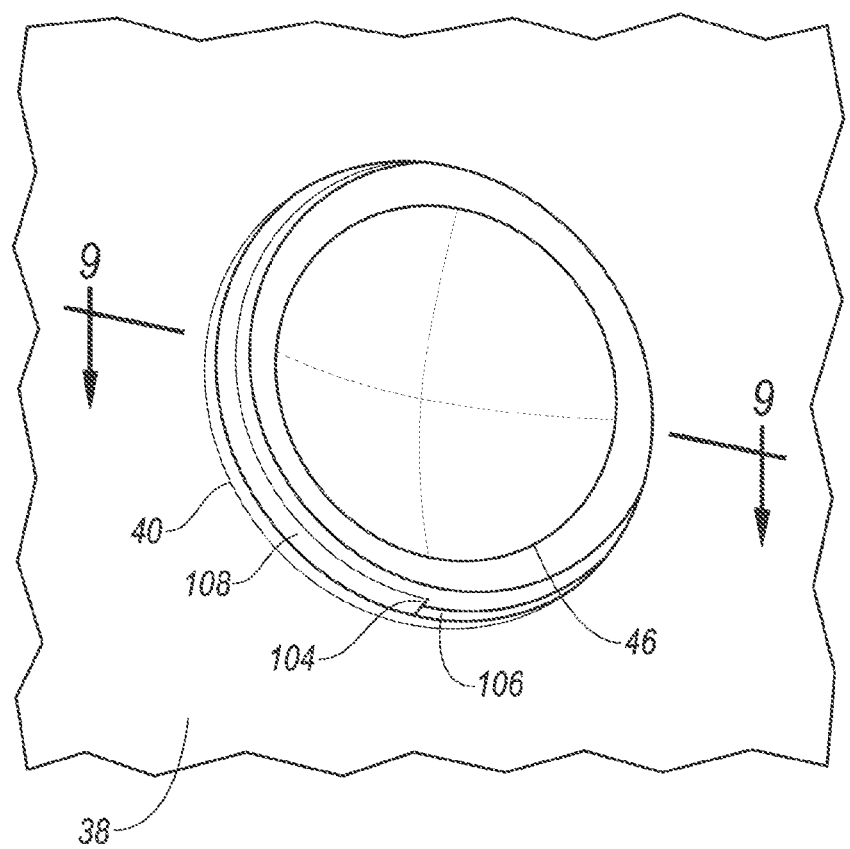
FIG. 6 is a perspective view of a portion of the housing.

With reference to FIGS. 5 and 6, the cameras 42 disposed in the housing 34 may be arranged to collectively cover a 360° field of view with respect to a horizontal plane. The cameras 42 are fixed inside the first chamber 36. The cameras 42 are fixedly attached directly or indirectly to the housing 34. Each camera 42 has a field of view through the respective lens 46 and the respective aperture 40, and the field of view of one of the cameras 42 may overlap the fields of view of the cameras 42 that are circumferentially adjacent to one another, i.e., that are immediately next to each other. The lenses 46 may be convex.

Figure 7:
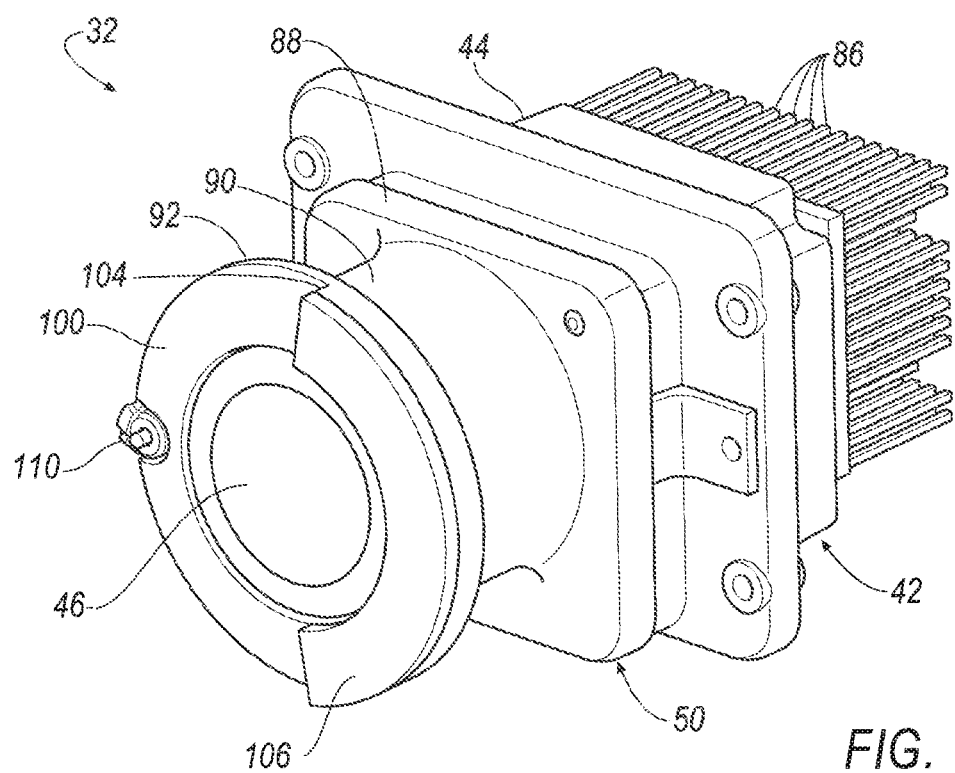
FIG. 7 is a perspective view of a portion of a sensor assembly.
Figure 9:
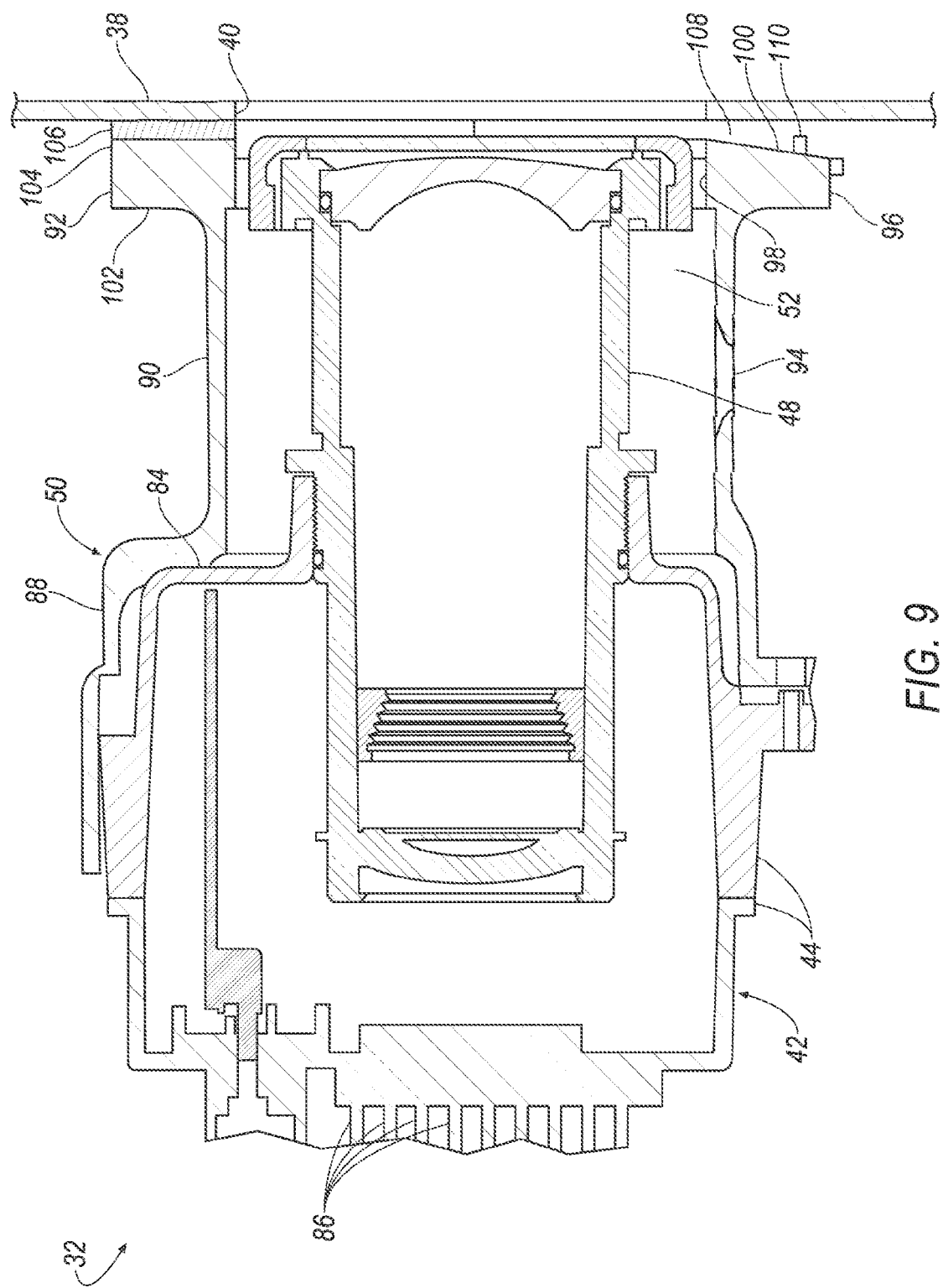
FIG. 9 is a cross-sectional view of the portion of the sensor assembly.

With reference to FIGS. 7 and 9, each camera 42 includes a base 44. The base 44 contains components for turning light focused by the lens 46 into a digital representation of the image, e.g., a mosaic filter, image sensor, analog—digital converter, etc. (not shown). The camera 42 is mounted to the housing 34 via the base 44. The base 44 includes a front face 84 to which the tube 48 is mounted. The base 44, specifically the front face 84, extends radially outward from the tube 48 relative to the tube 48, i.e., radially outward from an axis A defined by the tube 48. The front face 84 can be flat.

With reference to FIG. 9, the tube 48 extends from the front face 84 of the base 44. The tube 48 is cylindrical. The tube 48 may be a single piece with the base 44 or may be a separate component fixed to the base 44. The tube 48 defines an axis A. The axis A can be perpendicular to a plane defined by the front face 84. The lens 46 is disposed at an end of the tube 48 farthest from the base 44. The lens 46 is thus spaced from the base 44. The tube 48 is elongated along the axis A from the base 44 to the lens 46.

With reference to FIGS. 7 and 9, each camera 42 includes a plurality of fins 86. The fins 86 extend from the base 44 in an opposite direction as the tube 48 extends from the base 44. The fins 86 are thermally conductive, i.e., have a high thermal conductivity, e.g., a thermal conductivity equal to at least 15 watts per meter-Kelvin (W/(m K)), e.g., greater than 100 W/(m K), at 25° C. For example, the fins 86 may be aluminum. The fins 86 are shaped to have a high ratio of surface area to volume, e.g., long, thin poles or plates.

Figure 8:
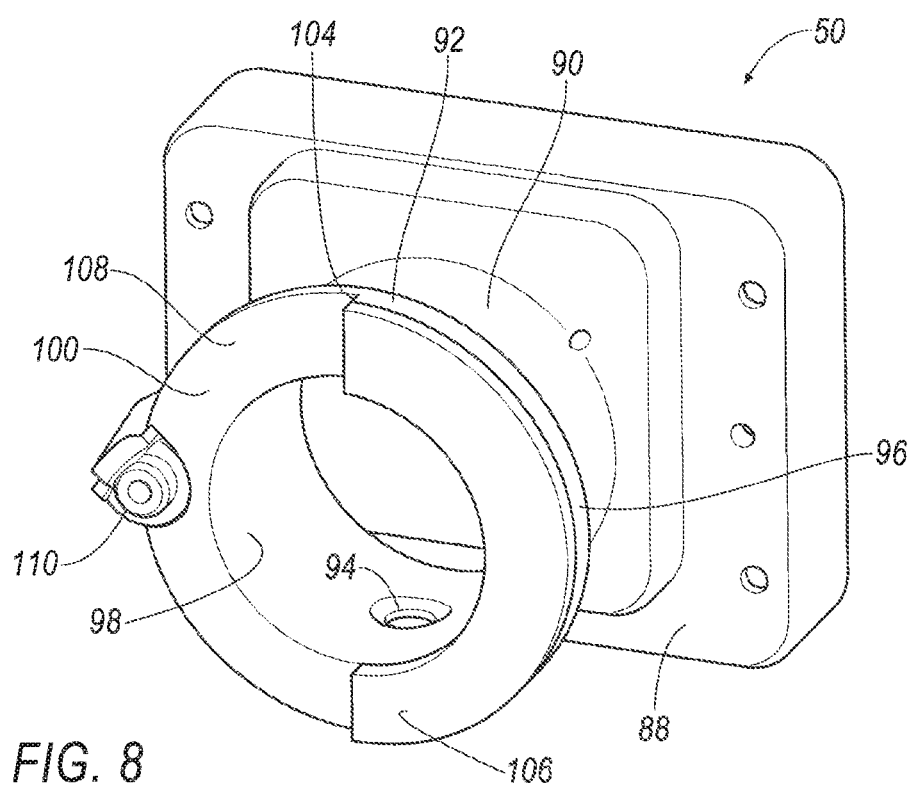
FIG. 8 is a perspective view of a tunnel of the sensor assembly.

With reference to FIGS. 7-9, the tunnel 50 is mounted to the base 44. The tunnel 50 includes a base portion 88, a tunnel portion 90, and a disc 92. The base portion 88 of the tunnel 50 is directly attached, e.g., bolted or fastened, to the base 44 of the camera 42. The tunnel 50 is only attached to the camera 42 via the base 44 of the camera 42.

The tunnel portion 90 is cylindrical. The base portion 88 extends radially outward from the tunnel portion 90. The base portion 88 extends along the front face 84 of the base 44. The tunnel portion 90 defines the axis A. The axis A can be perpendicular to a plane defined by the base portion 88 and perpendicular to the plane defined by the front face 84. The tunnel portion 90 is elongated concentrically with the tube 48 and defines the concentric gap 52 extending around the axis A. The tunnel portion 90 extends from the base portion 88 to the disc 92. The concentric gap 52 extends from the base 44 to the lens 46.

The tunnel 50 includes a drain hole 94. The drain hole 94 extends through the tunnel portion 90, i.e., from the concentric gap 52 to outside the tunnel portion 90, i.e., to the first chamber 36. The drain hole 94 is spaced from the base portion 88 and spaced from the disc 92. The drain hole 94 is spaced axially, i.e., along the axis A defined by the tunnel portion 90, from the base 44 and from the lens 46. The drain hole 94 is circumferentially located at a lowest point of the tunnel portion 90. Gravity tends to pull moisture that enters the concentric gap 52 downward toward the drain hole 94.

Each disc 92 is annular, i.e., has a toroidal shape, defining the axis A. The disc 92 is concentric around the lens 46 and defines a portion of the concentric gap 52. The axis A passes through a center of the respective lens 46. The disc 92 includes a radially outer surface 96, a radially inner surface 98, a front surface 100, and a back surface 102. The radially inner surface 98 extends circumferentially around the axis A and faces radially inwardly toward the axis A. The radially inner surface 98 is closer to the axis A than the radially outer surface 96. The radially inner surface 98 is continuous with an inner surface of the tunnel portion 90. The radially outer surface 96 extends circumferentially around the axis A and is farther from the axis A than the rest of the disc 92. The radially outer surface 96 is disposed in the first chamber 36 and spaced from the housing 34. The radially outer surface 96 is contactlessly exposed to the first chamber 36. For the purposes of this disclosure, "A is exposed to B" means that a surface A is disposed within a volume defined and enclosed by a structure B without intermediate components shielding the surface A from the structure B. For the purposes of this disclosure, "contactlessly" means without touching a solid object. The back surface 102 faces away from the panel 38. The back surface 102 extends circumferentially around the axis A and extends from the radially inner surface 98 to the radially outer surface 96. The back surface 102 may be flat. The back surface 102 is disposed in the first chamber 36 and spaced from the housing 34. The back surface 102 is contactlessly exposed to the first chamber 36.

The front surface 100 faces toward the panel 38. The front surface 100 extends circumferentially around the axis A either from one end of a projection 104 of the disc 92 and a seal 106 on the projection 104 (described below) to the other end of the projection 104 and the seal 106. The front surface 100 extends from the radially inner surface 98 to the radially outer surface 96. The front surface 100 slopes away from the panel 38 from the radially inner surface 98 to the radially outer surface 96. For example, the front surface 100 has a frustoconical shape around the axis A. The front surface 100 may have an angle measured from the axis A of approximately 45°.

A slot 108 is defined by the disc 92. The disc 92 is shaped to guide airflow from the first chamber 36, which has higher-than-atmospheric pressure, into an air curtain across the lens 46. The slot 108 is formed of the panel 38, the front surface 100 of the disc 92, the projection 104, and the seal 106. The front surface 100 extends along the slot 108. The projection 104 and the seal 106 are shaped to block airflow from the first chamber 36 through the aperture 40 other than through the slot 108. The seal 106 contacts the panel 38, and the front surface 100 is spaced from the panel 38. The slot 108 is annular and extends circumferentially around the axis A with the front surface 100. The slot 108 and the front surface 100 extend circumferentially from one end of the projection 104 and seal 106 to the other end of the projection 104 and seal 106. The projection 104 is annular and extends circumferentially from one end of the slot 108 to the other end of the slot 108. The slot 108 and the projection 104 (as well as the slot 108 and the seal 106) collectively extend 360° around the lens 46. For example, as shown in the Figures, the slot 108 extends approximately 180°, and the projection 104 and seal 106 extend together approximately 180°.

The seal 106 is attached to the tunnel 50, specifically mounted to the projection 104 of the disc 92. The seal 106 is a layer on top of the projection 104. The seal 106 extends from the radially inner surface 98 to the radially outer surface 96, and the seal 106 extends circumferentially about the axis A on the projection 104 from one end of the projection 104 to the other end of the projection 104. The seal 106 extends circumferentially partially around the lens 46. The seal 106 contacts, i.e., abuts, the panel 38 without being directly attached to the panel 38.

The seal 106 is elastomeric. An elastomeric material generally has a low Young's modulus and a high failure strain. The elastomeric material of the seal 106 reduces vibrations transmitted from the panel 38 to the camera 42. The seal 106 can be double-shot-molded with the tunnel 50, i.e., the tunnel 50 can be formed of a first material, the seal 106 can be formed of a second material different than the first material, with one of the materials injected into a mold while the other material is already in the mold and not yet solidified, resulting in molecular bonds between the two materials. The molecular bonds are stronger than when a first material is overmolded on another material that has already cooled.

With reference to FIGS. 7 and 8, a liquid nozzle 110 is mounted to the disc 92, specifically to the front surface 100. The liquid nozzle 110 is aimed through the slot 108 at the lens 46. Liquid ejected by the liquid nozzle 110 travels in the same direction as air passing through the slot 108. The liquid nozzle 110 is fluidly connected to a reservoir and a pump (not shown). The reservoir can be filled with washer fluid, and the pump can force the washer fluid from the reservoir through the liquid nozzle 110.

In operation, the pressure source 78 draws in air from the ambient environment and directs the air to the first chamber 36. The pressure source 78 causes the pressure of the first chamber 36 to increase above the atmospheric pressure outside the housing 34. The increased pressure forces air through the slot 108. The shape of the slot 108 causes the airflow to form an air curtain across the lens 46 of the camera 42. The air curtain can remove debris from the lens 46 as well as prevent debris from contacting the lens 46. Because the slot 108 extends approximately 180° around the axis A, the air curtain comes together at a center of the lens 46 and forms an air stream projecting outward from the lens 46, allowing the debris-blocking benefits of the air curtain to occur farther from the lens 46. The autonomous operation of the vehicle 30 can be improved by having the cameras 42 with unobstructed fields of view.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance, order, or quantity. Many modifications and variations of the present disclosure are possible in light of the above teachings, and the disclosure may be practiced otherwise than as specifically described.

What is claimed is:

1. A sensor assembly comprising:
   a housing defining a chamber and including a panel including an aperture;
   a camera disposed inside the chamber and including a base, a lens spaced from the base, and a tube elongated from the base to the lens, the lens defining a field of view of the camera through the aperture; and
   a tunnel mounted to the base and elongated concentrically with the tube, the tunnel defining a concentric gap between the tube and the tunnel from the base to the lens.

2. The sensor assembly of claim 1, further comprising a seal attached to the tunnel and contacting the panel.

3. The sensor assembly of claim 2, wherein the seal is double-shot-molded with the tunnel.

4. The sensor assembly of claim 2, wherein the seal is elastomeric.

5. The sensor assembly of claim 1, wherein the tunnel includes an annular disc concentric around the lens, and the disc defines an annular slot extending circumferentially partially around the lens.

6. The sensor assembly of claim 5, wherein the disc is shaped to guide airflow from inside the housing through the slot into an air curtain across the lens.

7. The sensor assembly of claim 5, wherein the disc and the panel form the slot.

8. The sensor assembly of claim 5, further comprising a seal mounted to the annular disc, extending circumferentially partially around the lens, and contacting the panel.

9. The sensor assembly of claim 8, wherein the seal and the slot collectively extend 360° around the lens.

10. The sensor assembly of claim 8, wherein the seal blocks airflow from inside the housing through the aperture except through the slot.

11. The sensor assembly of claim 5, further comprising a liquid nozzle mounted to the disc and aimed through the slot at the lens.

12. The sensor assembly of claim 5, wherein the disc includes a radially inner surface, a radially outer surface, and a front surface extending along the slot and facing toward the panel, and the front surface slopes away from the panel from the radially inner surface to the radially outer surface.

13. The sensor assembly of claim 5, further comprising a pressure source positioned to raise a pressure in the chamber above an atmospheric pressure.

14. The sensor assembly of claim 13, wherein the pressure source is a blower.

15. The sensor assembly of claim 1, wherein the tunnel includes a drain hole.

16. The sensor assembly of claim 15, wherein the drain hole is axially spaced from the base and from the lens.

17. The sensor assembly of claim 1, wherein the aperture is circular.

18. The sensor assembly of claim 1, wherein the tunnel does not contact the tube.

* * * * *